June 7, 1960 P. E. WINTER 2,939,713

RECORD PLAYER

Filed May 7. 1956 3 Sheets-Sheet 1

INVENTOR
Philippe E. Winter
BY
Holcombe, Wetherill & Brisebois
ATTORNEY

June 7, 1960 P. E. WINTER 2,939,713

RECORD PLAYER

Filed May 7. 1956 3 Sheets-Sheet 2

INVENTOR
Philippe E. Winter
BY
Holcomb, Wetherill & Brisebois
ATTORNEY

June 7, 1960 P. E. WINTER 2,939,713

RECORD PLAYER

Filed May 7, 1956 3 Sheets-Sheet 3

INVENTOR
Philippe E. Winter
BY
Holcomb, Wetherill & Brisebois
ATTORNEY 2,939,713

RECORD PLAYER

Philippe Emmanuel Winter, 11 Kahlstrasse, Basel, Switzerland

Filed May 7, 1956, Ser. No. 583,266

Claims priority, application Great Britain May 11, 1955

3 Claims. (Cl. 274—9)

This invention relates to record players for playing phonograph records of the disc type. It has amongst its principal objects the provision of a novel and improved record player for this purpose which is convenient and easy to use and one which can be made of compact construction and of attractive appearance.

A further object of the invention is the provision of a record player which provides for a particularly convenient insertion and positioning of a record to be played and for the easy removal of the record after playing.

Another object of the invention is the provision of a record player having an elongated or slot-like opening into which the record can easily be inserted and which includes means for automatically positioning and supporting the record in its playing position, without requiring the exercise of any particular care or skill on the part of the user of the apparatus.

A still further object of the invention is the provision of such a record player which includes means responsive to the insertion of a record for effecting automatically all the operations necessary to start playing, including the correct location of the record in its playing position, the starting of the motor driving the record, the engagement of a pick-up with the record and the switching-on of an amplifier associated with the pick-up.

Yet another object of the invention is the provision of such a record player which includes means for automatically stopping the motor and switching off the amplifier after play and which also includes means for ejecting the record partly from the case to allow its easy removal from the latter.

The invention will now be described more fully with reference to the accompanying drawings which show, by way of example, one form of portable record player constructed in accordance therewith. The record player which is shown is more particularly designed for playing disc records of the type having a large central hole, such as are intended to rotate during play at 45 r.p.m.

Figure 1:
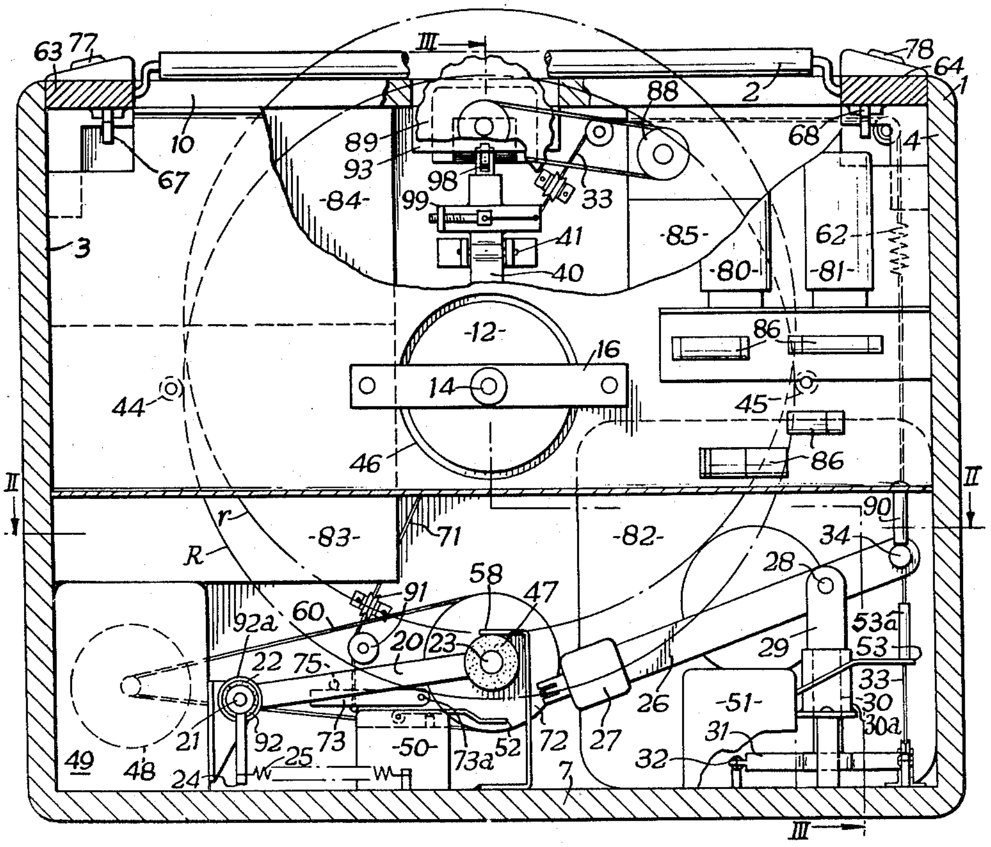
Figure 1 is a rear elevational view of the record player with the rear wall of the case removed to expose internal details.
Figure 2:
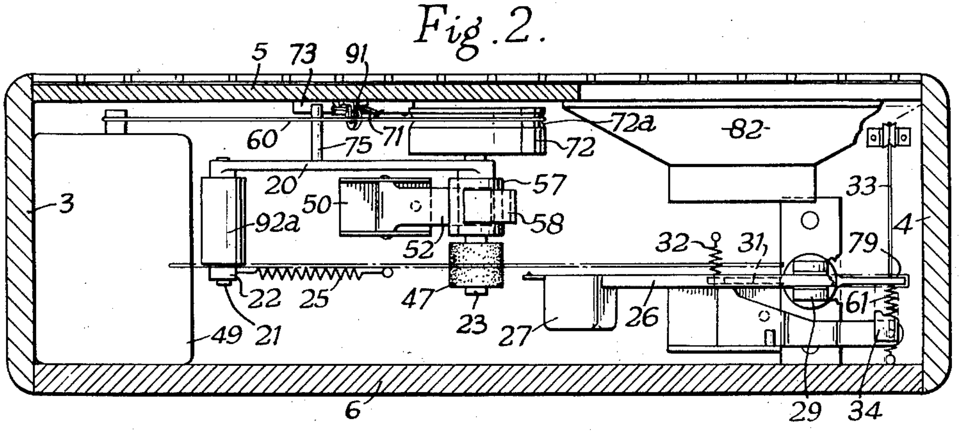
Figure 2 is a transverse sectional view on the line II—II in Figure 1.
Figure 3:
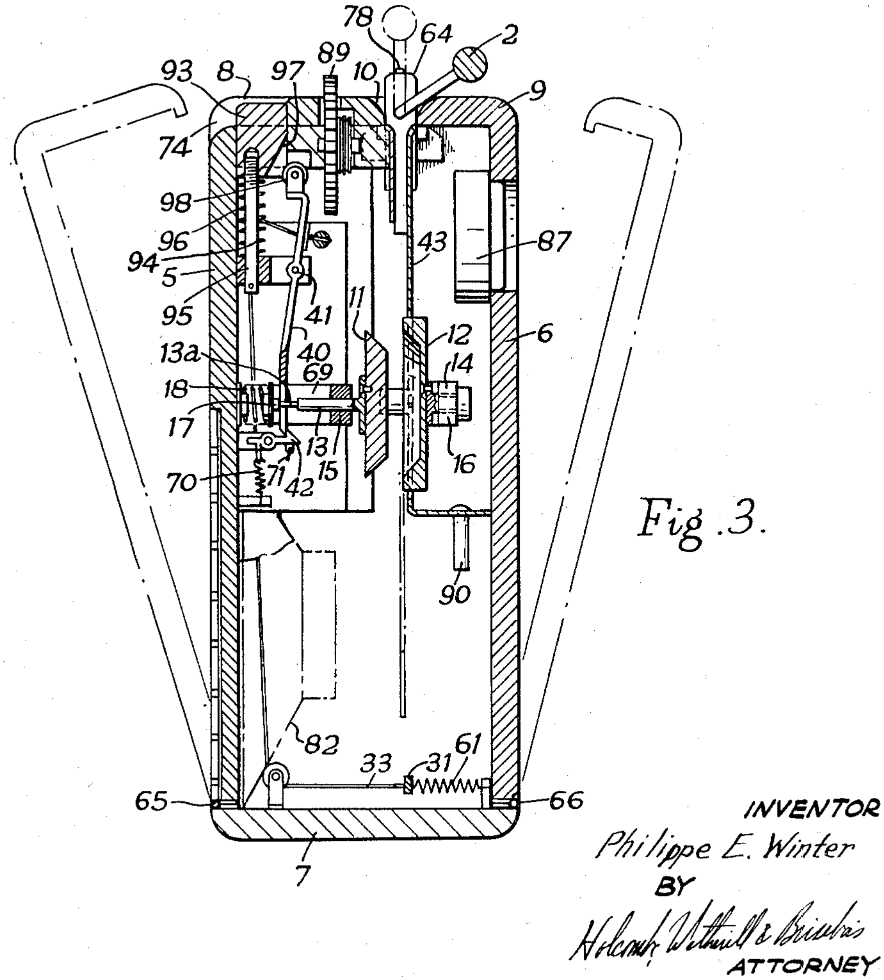
Figure 3 is a vertical sectional view on the line III—III in Figure 1, various parts being omitted for the sake of clarity

Referring to Figures 1 to 3, the case 1 of the record player has a handle 2 at its upper part in order that it may be carried readily. The handle 2 extends between the side walls 3 and 4 of the case 1, being pivotally mounted in brackets 63 and 64 carried by the walls 3 and 4. A chassis-plate 43 also extends between the side walls 3 and 4.

The front and rear walls 5 and 6 of the case are connected to the base 7 by means of hinges 65 and 66 so that they may be opened, as indicated in Figure 3, when it is necessary to gain access to the mechanism of the record player. The walls 5 and 6 are retained in their closed positions by means of spring clips 67 and 68 which can be disengaged by means of press-buttons 77 and 78 and the mchanism of which is housed in the brackets 63 and 64.

The front and rear walls 5 and 6 are similar in construction. Each has a flange portion 8 or 9 extending from its upper edge at right angles to the main part thereof. When the front and rear walls 5 and 6 are in their closed positions, these flange portions together form the top of the case. The width of the flange portions 8 and 9 is such that, in this position, their adjacent edges do not quite meet, thus leaving a narrow slot or opening 10 which is located above and to one side of the chassis-plate 43.

When it is desired to play a record, the latter is inserted vertically downwards into the slot 10, being guided in its downward movement within the case by two pegs. These pegs are mounted on the face of the plate 43 which face is not visible in Figure 1, the positions of the pegs being indicated in dotted lines at 44 and 45. The pegs extend perpendicularly to the plane of a record inserted into the slot 10.

When the record reaches its correct playing position within the case, it initiates the operation of the record playing mechanism without any manual controls having to be operated, as will be described hereinafter.

During play a record rotates in a vertical plane, being located and supported by two rotatably mounted supporting or gripping members 11 and 12, which may conveniently be moulded from a synthetic plastic material. The supporting member 11 is frusto-conical in shape, while the member 12 is in the form of a hollow countermember in which the conical member 11 is adapted to engage so as to grip the record. The member 12 is carried by a shaft 14 which is mounted so as to be freely rotatable in a bridge-piece 16 carried by the plate 43. The bridge-piece 16 extends across a circular hole 46 which is formed in the plate 43 and through which the counterpart member 12 projects.

The member 11 is carried by a shaft 13 which is both slidable and freely rotatable in a bridge-piece 15 which is mounted on the inner surface of the wall 5, by means of two struts, of which only one is visible in Figure 3, being shown at 69. The free end of the shaft 13 is shaped to be engaged by a bearing 17 which is loaded by a spring 18. During play the spring-loaded bearing 17 presses the supporting member 11 into engagement with the counter-member 12 so as to grip the record.

A lever arm 20 is arranged near the base 7 of the case, extending from a rod 21 turnably mounted in a bearing. The bearing is resiliently mounted or cushioned in a rubber sleeve 92 carried by a spring-clip 92*a*. An axle 23 is rotatably mounted near the free end of the lever 20 and carries, on one side of the lever 20, a rubber roller 47 and, on the other side of the lever, a pulley 72 which also acts as a flywheel and which is provided with a rubber-lined groove 72*a*. A rubber sleeve 57 is slid on to the housing of the bearing in which the axle 23 is journalled.

A pin 24 extends from a collar 22 which is fast on the rod 21 and has secured thereto a tension spring 25 which is so arranged that the lever 20 tends to pivot in such a direction that the axle 23 is urged upwardly as viewed in Figure 1, the upward pivoting of the lever being limited by the engagement of the sleeve 57 with a bracket 58. An electric motor 48 is embedded in a mass of sponge rubber 49 which thus provides a resilient and sound-absorbent mounting for the motor. The motor 48 drives the pulley 72 by means of a driving band 60.

The biasing action which the spring 25 exerts on the lever 20 and the resilient mounting of the motor 48, provided by the rubber mass 49, ensure that sufficient tension is maintained in the driving band 60 for driving purposes irrespective of the angular position of the lever 20.

A tone-arm 26 which carries a pick-up head 27 is pivotably mounted, intermediately of its length, on a needle bearing 28 which is mounted in a U-piece 29 mounted at the upper end of an upwardly extending rod 30. The rod 30 is itself rotatably mounted in a bearing 30*a* so as to allow the pivotal movement of the tone-arm 26 necessary for moving the pick-up head 27 towards and away from the surface of the record. At its lower end the rod 30 carries a cross-piece 31 to one end of which is attached a coil spring 32 which biases the tone-arm 26 towards the record. The other end of the cross-piece 31 is formed at 79 with a hole through which passes a steel wire 33. The wire 33, which is maintained under tension by means of springs 61 and 62, is employed in a manner to be described hereinafter, for preventing movement of the tone-arm 26 towards the record under the action of the spring 32 when necessary.

The pivoting of the tone-arm 26 necessary to cause movement of the pick-up head 27 towards and away from the centre of the record takes place about the needle bearing 28. This bearing is mounted so that the axis about which the tone-arm 26 rotates is not quite perpendicular to the plane of a record inserted in the record player, its direction of inclination being such that, during downward swinging of the tone-arm 26 away from the centre of the record under gravity, the distance between the pick-up head 27 and the surface of the record increases slightly, in addition to any such increase caused by turning of the rod 30 in its bearing 30*a*. This reduces the risk of the record being scratched when the pick-up stylus is removed from contact therewith.

It has already been mentioned that the tone-arm 26 is pivoted intermediately of its length. In order that gravity shall not cause undue pressure to be exerted by the pick-up stylus laterally of the record groove, the tone-arm 26 carries, at the end remote from that which carries the pick-up head 27, a rod 34 which serves as a counter-weight and which, by engagement with a stop 90 carried by the chassis-plate 43, serves to limit downward swinging of the tone-arm 26.

The balanced mounting of the tone-arm and the arrangement by means of which the pick-up head 27 is spring-urged into engagement with the record-groove protect the record and the pick-up stylus against shocks which may occur during play. This feature is of considerable importance in a portable record player and allows the player to be operated in unsteady conditons such as, for instance, in a boat or a moving vehicle.

Considering again the mechanism for supporting a record during play, the shaft 13 is formed with a portion 13*a* of reduced diameter which engages between the jaws of a fork-member 40. This fork-member is pivotally mounted at 41 so that it can turn through the limited arc necessary to allow the member 11 to move into and out of engagement with the counter-member 12. When there is no record in the playing position, the fork-member 40 is retained by a latch 42 in the position shown in Figure 1, in which it prevents movement of the member 11 into engagement with the counter-member 12. The latch 42 is urged into engagement with the fork-member 40 by means of a spring 70 but, in order that it can be disengaged from the fork-member 40 upon the insertion of a record, it is mechanically connected with the lever 20. This mechanical connection consists of a wire 71 which is guided by pulleys 91 and which is connected between the latch 42 and a trigger 73 which is turnably mounted on the wall 5 at 73*a*. The trigger 73 is so arranged that, when the wall 5 is in the closed position, it can be actuated by a stud 75 carried by the lever 20. The wire 33 which, as previously mentioned, is used for preventing movement of the tone-arm 26 under the action of the spring 32, is connected to a cross-piece 99 secured to the fork-member 40.

A manual operating key 93 is provided for withdrawing the supporting member 11 out of engagement with the counter-member 12, into the position shown in Figure 1. The key 93 is arranged in a recess 74 in the wall 5 and is carried at the end of a rod 94 which is slidably mounted at 95, the key 93 being urged upwardly by means of a spring 96. The key 93 is formed with an inclined cam surface 97 which, when the member 11 is in engagement with the member 12 and the key is depressed, is caused to bear against a roller 98 carried by the fork-member 40, so as to deflect the latter into the position shown in the drawing. During such deflection the latch 42 is first pivoted downwardly and then snaps into the engaged position shown in the drawings.

The record player includes conventional sound-amplifying and reproducing circuits comprising valves 80 and 81, a loud-speaker 82 and other circuit components indicated schematically at 86. The high-tension power supply for the amplifying circuit is provided by a dry battery 83 while banks 84 and 85 of low-tension dry batteries provide the low tension power supply for the amplifying circuit and also the power supply for the motor 48. The motor circuit includes a rheostat 87 by means of which the resistance of the motor circuit can be varied to compensate for variations in the voltage of the batteries which occur during use. The amplifying and reproducing circuit includes a potentiometer 88 which serves as a volume control, the potentiometer being adjusted by means of a thumb wheel 89. The electrical connections between these various elements are not shown in the drawing.

Two switch sets 50 and 51, each consisting of three micro-switches, are also provided, being mounted on the base 7. The switches of the set 50 are normally "off" while those of the set 51 are normally "on." Corresponding switches of the two sets are connected in series, the three pairs of series-connected switches controlling respectively the high and low tension power supplies to the amplifying and reproducing circuits and the power supply to the motor 48.

The operation of the record player is as follows:

The record which is to be played is lowered into the slot 10 until it rests on the roller 47, the record now being in the position indicated by the chainline *r*, Figure 1. The record is then pressed downwardly into the position indicated by the chain line R, bearing against the roller 47 so as to cause the lever 20 to be turned downwardly through a small arc. The stud 75 carried by the lever 20 thus actuates the trigger 72 so that a pull is applied to the wire 71. This causes the latch 42 to be pivoted, against the action of the spring 70, out of engagement with the fork-member 40. The member 11 is thus free to move, under the action of the spring 18, into engagement with the counter-part 12 to grip the record.

While the fork-member 40 is held by the latch 42 in the position in which it retains the support-member 11 away from the counter-member 12, the wire 33 extends the spring 61. The left-hand end of the spring 61, as viewed in Figure 3, thus bears against the cross-piece 31 and causes the latter to turn, drawing the tone-arm 26 away from the surface of the record against the action of the biassing spring 32. However, as soon as the support-member 11 is allowed to move towards the counter-member 12, thus pivoting the fork-member 40, the tension in the wire 33 slackens sufficiently to allow the pickup head 27 to move into engagement with the record groove under the action of the biassing spring 32.

Meanwhile, as a result of the pivoting of the lever 20, due to the insertion of the record, the sleeve 57 carried by the lever 20 strikes an actuating arm 52 which closes the switches of the set 50, thus switching on the power-supplies to the motor and to the amplifying and reproducing circuits. Thus, as soon as the pick-up head 27 moves into engagement with the record, play commences, the record being rotated through roller 47 in frictional engagement with its rim.

The actuating arm 53 of the set of switches 51 is disposed in such a position that, when the tone-arm 26 reaches the position which it occupies when the pickup stylus has reached the end of the record-groove, a stop 53a carried by the arm 53 is engaged by the counterweight 34, thus causing the power supplies to be switched off.

After the current has been switched off, the record and the tone-arm remain in the positions which they now occupy until the key 93 is depressed. As it is depressed, the cam surface 97 of the key 93 bears against the roller 98 carried by the fork-member 40 and causes it to pivot, withdrawing the support member 11 from engagement with the counter-member 12, against the action of the spring 18, and pulling the tone-arm 26 away from the surface of the record by means of the wire 33. Once the tone-arm has been disengaged from the record-groove, it swings downwardly and away from the surface of the record, under gravity. The consequent upward movement of the counterweight 34 releases the actuating arm 53 and allows the switches 51 to return to their normal "on" positions.

Meanwhile, withdrawal of the supporting member 11 releases the record so that the lever 20 is free to swing upwardly, displacing the record into the position indicated by the chain-line *r* in Figure 1. In this position the record projects out of the case so that it can readily be removed by hand. The record player is then ready to receive a further record.

Figure 4:
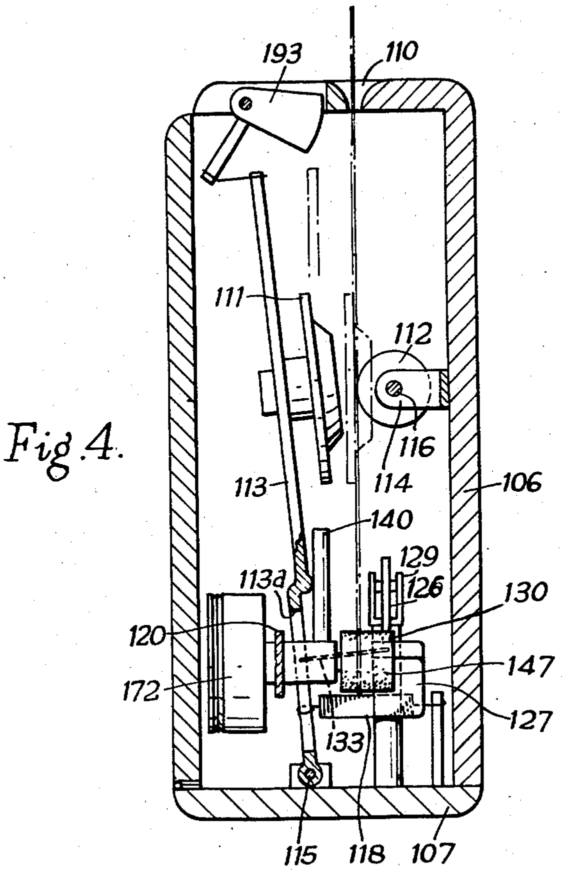
Figure 4 is a sectional view of a modified form of record player.

Referring now to Figure 4, which shows a modified form of record player and in which only those parts are shown which are essential to the description of the modified form of record player, the record is gripped, in playing position, between a frusto-conical member 111 which engages in the central hole of the record and a pair of rollers. During rotation of the record, the rollers roll on the surface of the record adjacent the edge of the central hole. Only one of the rollers is visible in Figure 4, being shown at 112. The roller 112 is rotatably mounted on an axle 116 which extends parallel to the base 107 and is mounted in a bracket 114 carried by the rear wall 106. The other roller is similarly mounted so that the two rollers run freely over the surface of the record as this is inserted into the case through a slot 110 which corresponds to the slot 10 of Figure 3. Each roller has a rubber peripheral portion in order to reduce noise during rotation of the record.

The support member 111 is rotatably mounted on a lever 113 which is pivoted at 115. The lever 113 is urged into the operative position (shown in chain lines in Figure 4) by means of a spring 118. The lever 113 is forked so as to provide a recessed portion 113a which cooperates wtih a stud 140, as will be described hereinafter. The stud 140 is carried by a lever-arm 120 which, as in the record player of Figures 1 to 3, carries an axle upon which are secured a heavy drive pulley 172 and a rubber roller 147, the latter being adapted to engage frictionally the edge of a record in order to rotate the latter.

A pick-up head 127 is carried by a tone-arm 126 which is pivotally mounted in a U-piece 129, the U-piece 129 being carried by a rod 130 which is turnable to move the pick-up head 127 towards and away from the surface of the record. The rod 130 carries a cross-piece (not visible in the drawing) to which is attached one end of a wire 133, the other end of which is attached to the lever 113.

The operation of this form of record player is as follows:

A record is inserted into the slot 110 and pressed downwardly. The periphery of the record engages the roller 147 and the lever-arm 120 is thus depressed, so that the stud 140 also moves downwardly and engages in the recessed portion 113a of the lever 113, which latter moves into the position shown in chain lines, under the action of the spring 118.

This movement of the lever 113 allows the wire 133 to move to the right, as viewed in Figure 4, so that the pick-up head 127 swings into engagement with the record under the action of a spring (not shown). The downward movement of the lever 120 also actuates switches which switch on the power supplies in a manner similar to that described with reference to Figures 1 to 3 and play commences.

When play has been completed, the movement of the tone arm 126 into its terminal position causes the power supplies to be switched off. When it is desired to eject the record, the key 193 is depressed thus withdrawing the lever 113 into the position shown in full lines. This movement of the lever 113 releases the stud 140, so that the lever-arm 120 swings upwardly, carrying the record with it. The record player is then ready to receive another record.

It will be understood that, in the record players hereinbefore described, the only operation which has to be performed manually, apart from the variation of speed and volume, is the displacement of a record from the playing position after play has been completed. It would, of course, be possible to arrange for this to be carried out automatically, such automatic displacement being effected by movement of the tone-arm into the position which it occupies when the pick-up stylus has reached the end of the record groove. In one form of record player in which such displacement is effected automatically, when the pick-up stylus reaches the end of the record-groove, the tone-arm strikes a switch-actuating member which energises an electro-magnet causing the movable support member to be moved out of its record-engaging position. Time delay means are provided so that, when the support member has been latched into its inoperative position, the supply of electric current to the electro-magnet is cut off.

While the invention has been described, in detail, with reference to record players for playing records of the type intended to rotate at 45 r.p.m., similar record players could be constructed for playing records of one or more other types with suitable modification of the support members. However, the restriction of the record players to the playing of records intended to rotate at 45 r.p.m. allows a particularly compact construction to be achieved.

I claim:

1. A record player for use with disc records comprising a case having a slot-like opening for the edge-wise insertion of a record to be played with the record in a substantially vertical plane, a drive roller adapted to engage frictionally the rim of the record to drive the latter, means for supporting and locating the record for rotation about its axis, drive means for driving the roller, means for moving the drive roller substantially radially upon engagement by the rim of the record to operate said driving means to rotate the roller and means for reproducing the sounds recorded on the record.

2. A record player for use with disc records comprising a case having a slot-like opening for the edge-wise insertion of a record to be played, a movable actuating element carrying a drive roller which is adapted to be engaged by the rim of the record to displace the actuating element as the record moves into its playing position, a motor for driving the drive roller, a pair of gripping members one on each side of the record, means actuated by the movement of the actuating element as the record approaches its playing position for moving one of the gripping members towards the other to support and locate the record for rotation about its axis, means biassing the drive roller into frictional engagement with the rim of the record during playing to drive the record, means including a pick-up and an amplifier for reproducing the sounds recorded on the record, switch means controlled by the actuating element for starting the motor and for energizing the amplifier when a record is inserted, means for moving the pick-up into engagement with the record after the insertion of the latter and means operable after playing for switching off the motor and the amplifier, and means for disengaging the pick-up from the record and for disengaging the gripping members from the record to allow the removal of the latter.

3. A record player according to claim 2, wherein the drive roller acts on the record in a direction to eject the latter partly from the case automatically upon the disengagement of the gripping members from the record.

References Cited in the file of this patent

UNITED STATES PATENTS

| | | |
|---|---|---|
| 1,320,035 | Birket | Oct. 28, 1919 |
| 1,422,321 | Swain | July 11, 1922 |
| 1,954,247 | Jones et al. | Apr. 10, 1934 |
| 2,100,686 | Collaro et al. | Nov. 30, 1937 |
| 2,340,418 | Gabel | Feb. 1, 1944 |
| 2,357,034 | Thompson et al. | Aug. 29, 1944 |
| 2,406,355 | Darwin et al. | Aug. 27, 1946 |
| 2,489,146 | Louchheim | Nov. 22, 1949 |
| 2,555,895 | Lynch | June 5, 1951 |

FOREIGN PATENTS

| | | |
|---|---|---|
| 539,492 | Great Britain | Sept. 12, 1941 |